(12) United States Patent
Latapie et al.

(10) Patent No.: US 11,966,413 B2
(45) Date of Patent: Apr. 23, 2024

(54) FEDERATED ARTIFICIAL INTELLIGENCE WITH CUMULATIVE LEARNING IN A COMPUTER NETWORK

(71) Applicant: Cisco Technology, Inc., San Jose, CA (US)

(72) Inventors: Hugo Latapie, Long Beach, CA (US); Enzo Fenoglio, Issy-les-Moulineaux (FR); Carlos M. Pignataro, Cary, NC (US); Nagendra Kumar Nainar, Morrisville, NC (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 986 days.

(21) Appl. No.: 16/811,806

(22) Filed: Mar. 6, 2020

(65) Prior Publication Data

US 2021/0279619 A1 Sep. 9, 2021

(51) Int. Cl.
| | |
|---|---|
| *G06F 16/27* | (2019.01) |
| *G06F 18/00* | (2023.01) |
| *G06N 5/022* | (2023.01) |
| *G06N 5/043* | (2023.01) |
| *G06N 5/048* | (2023.01) |
| *G06N 20/00* | (2019.01) |

(52) U.S. Cl.
CPC .............. *G06F 16/27* (2019.01); *G06F 18/00* (2023.01); *G06N 5/022* (2013.01); *G06N 5/043* (2013.01); *G06N 5/048* (2013.01); *G06N 20/00* (2019.01)

(58) Field of Classification Search
None
See application file for complete search history.

(56) References Cited

U.S. PATENT DOCUMENTS

| 8,189,905 B2 * | 5/2012 | Eaton ..................... G06V 20/41 |
| | | 382/107 |
| 10,887,197 B2 | 1/2021 | Fenoglio et al. |
| 10,965,516 B2 | 3/2021 | Fenoglio et al. |
| 2018/0035938 A1 | 2/2018 | el Kaliouby et al. |
| 2018/0293517 A1 | 10/2018 | Browne et al. |
| 2019/0306011 A1 | 10/2019 | Fenoglio et al. |
| 2020/0022016 A1 | 1/2020 | Fenoglio et al. |

(Continued)

OTHER PUBLICATIONS

S. Russell and P. Norvig, Artificial Intelligence: A Modern Approach, 2nd Ed., 2003, chapt. 7-10, pp. 194-374. (Year: 2003).*

(Continued)

*Primary Examiner* — Vincent Gonzales
(74) *Attorney, Agent, or Firm* — BEHMKE INNOVATION GROUP LLC; James M. Behmke; James J. Wong

(57) ABSTRACT

In one embodiment, a first deep fusion reasoning engine (DFRE) agent in a network receives first sensor data from a first set of one or more sensors in the network. The first DFRE agent translates the first sensor data into symbolic data. The first DFRE agent applies, using a symbolic knowledge base maintained by the first DFRE agent, symbolic reasoning to the symbolic data to make an inference regarding the first sensor data. The first DFRE agent updates, based on the inference regarding the first sensor data, the knowledge base. The first DFRE agent propagates the inference to one or more other DFRE agents in the network.

18 Claims, 13 Drawing Sheets

(56) References Cited

U.S. PATENT DOCUMENTS

| | | | |
|---|---|---|---|
| 2020/0089983 | A1* | 3/2020 | Manickam ............ G06V 10/764 |
| 2021/0042532 | A1 | 2/2021 | Latapie et al. |
| 2021/0174155 | A1 | 6/2021 | Smith et al. |
| 2021/0279615 | A1 | 9/2021 | Latapie et al. |
| 2021/0390423 | A1 | 12/2021 | Latapie et al. |

OTHER PUBLICATIONS

Srinivasan, D., Jain, L.C. (eds) Innovations in Multi-Agent Systems and Applications—1. Studies in Computational Intelligence, vol. 310. Springer, Berlin, Heidelberg. 303 pages. 2010. (Year: 2010).*

Patricio MA, Carbó J, Pérez O, García J, Molina JM. Multi-agent framework in visual sensor networks. EURASIP Journal on Advances in Signal Processing. Dec. 2006., pp. 1-21. (Year: 2006).*

Smart P, Huynh T, Braines D, Sycara K, Shadbolt N. Collective cognition: Exploring the dynamics of belief propagation and collective problem solving in multi-agent systems. Network-Enabled Cognition: The Contribution of Social and Technological Networks to Human Cognition. Jul. 10, 2010. (Year: 2010).*

Kuo YL, Hsu JY. Planning for reasoning with multiple common sense knowledge bases. ACM Transactions on Interactive Intelligent Systems (TiiS). Sep. 1, 2012;2(3):1-24. (Year: 2012).*

S. Russell and P. Norvig, Artificial Intelligence: A Modern Approach, 2nd Ed., 2003, chapt 11-12, pp. 375-461. (Year: 2003).*

Asl, et al., "A New Approach on Multi-Agent Multi-Objective Reinforcement Learning Based on Agents' Preferences", 2017 Artificial Intelligence and Signal Processing Conference (AISP), Oct. 2017, 6 pages, Shiraz, Iran.

Chen, et al., "Knowledge-Embedded Representation Learning for Fine-Grained Image Recognition", online: https://www.ijcai.org/Proceedings/2018/0087.pdf, Proceedings of the Twenty-Seventh International Joint Conference on Artificial Intelligence (IJCAI-18), Jul. 2018, pp. 627-634.

Claise, et al., "Service Assurance for Intent-Based Networking Architecture", OPSAWG Internet Draft, draft-claise-opsawg-service-assurance-architecture-01, Nov. 2019, 14 pages, IETF Trust.

Critch, Andrew, "Toward Negotiable Reinforcement Learning: Shifting Priorities in Pareto Optimal Sequential Decision-Making", online: https://arxiv.org/pdf/1701.01302.pdf, May 2017, 19 pages.

Fei, et al., "Learning Cumulatively to Become More Knowledgeable", KDD '16: Proceedings of the 22nd ACM SIGKDD International Conference on Knowledge Discovery and Data Mining, Aug. 2016, pp. 1565-1574, ACM.

Hadfield-Menell, et al., "Cooperative Inverse Reinforcement Learning", online: https://arxiv.org/pdf/1606.03137.pdf, 30th Conference on Neural Information Processing Systems (NIPS 2016), Nov. 2016, 9 pages.

Hu, Ruiqi, "Learning and Representing Attributed Graphs", Thesis, University of Technology Sydney, 2018, 146 pages, Sydney, Australia.

Javed, et al., "Meta-Learning Representations for Continual Learning", online: https://arxiv.org/abs/1905.12588, 33rd Conference on Neural Information Processing Systems (NeurIPS 2019), Vancouver, Canada, May 2019, 15 pages.

Kozerawski, et al., "CLEAR: Cumulative LEARning for One-Shot One-Class Image Recognition", 2018 IEEE/CVF Conference on Computer Vision and Pattern Recognition, Jun. 2018, pp. 3446-3455, IEEE.

Malysheva, et al., "Deep Multi-Agent Reinforcement Learning with Relevance Graphs", online: https://arxiv.org/pdf/1811.12557.pdf, 32nd Conference on Neural Information Processing Systems (NIPS 2018), Nov. 2018, 10 pages.

Nguyen, Thanh Thi, "A Multi-Objective Deep Reinforcement Learning Framework", online: https://arxiv.org/ftp/arxiv/papers/1803/1803.02965.pdf, Mar. 2018, 17 pages.

"Cumulative Learning", online: https://en.wikipedia.org/wiki/Cumulative_learing, printed Mar. 2020, 2 pages, WikiMedia Foundation, Inc.

"In-Memory Database", online: https://en/wikipedia.org/wiki/In-memory_database, printed Mar. 2020, 2 pages, Wikimedia Foundation, Inc.

"Redis", online: https://en/wikipedia.org/wiki/Redis, printed Mar. 2020, 5 pages, Wikimedia Foundation, Inc.

Agrawal, et al., "VQA: Visual Question Answering", Proceedings of the IEEE International Conference on Computer Vision (ICCV), 2015, 25 pages, arXiv:1505.00468v7 [cs.CL].

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

Gärdenfors, Peter, "Conceptual Spaces: The Geometry of Thought", 2000, 398 pages, MIT Press.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

(56) References Cited

OTHER PUBLICATIONS

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.

Ma, et al., "Granular computing and Dual Galois Connection", Information Sciences, 177(23), 2007, pp. 5365–5377, Elsevier Inc.

Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.

Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.

Pauli, Wolfgang, "Part I. General: (A) theory. Some relations between electrochemical behaviour and the structure of colloids", Jan. 1935, pp. 11-27, Transactions of the Faraday Society, vol. 1.

Scarselli, et al., "The Graph Neural Network Model", IEEE Transactions on Neural Networks (vol. 20, Issue: 1, Jan. 2009), pp. 61-80, IEEE.

Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "CODAM: A neural network model of consciousness", Neural Networks 20 (2007), pp. 983-992, Elsevier Ltd.

Taylor, J. G., "William James on Consciousness Beyond the Margin", 1996, 231 pages, Princeton University Press.

THóRISSON, et al., "Cumulative Learning", Artificial General Intelligence—12th International Conference, AGI 2019, Proceedings, pp. 198-208, Springer.

THóRISSON, Kristinn R., "A New Constructivist AI: From Manual Methods to Self-Constructive Systems", Chapter 9, Apr. 2012, pp. 147-174, Atlantis Press Book.

THóRISSON, Kristinn R., "Integrated AI Systems", Minds & Machines 17, Mar. 2007, pp. 11-25.

Tonioni, et al., "Product recognition in store shelves as a sub-graph isomorphism problem", online: https://arxiv.org/abs/1707.08378, Sep. 2017, 14 pages.

Unger, et al., "The Singular Universe and the Reality of Time: A Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, Pei, "Rigid Flexibility—The Logic of Intelligence", Draft for Comment, Feb. 8, 2004, 329 pages, mindspring.com.

Wang, et al. "Self in NARS, an AGI System", vol. 5, Article 20, Mar. 2018, 15 pages, Frontiers in Robotics and AI.

Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: An Approach Based on Heirarchies of Concepts", I. Rival (Ed.), Ordered Sets, 1982, pp. 314-339.

Yao, et al., "A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

(56) References Cited

OTHER PUBLICATIONS

Gudi, et al., "Deep Learning based FACS Action Unit Occurrence and Intensity Estimation", 2015 11th IEEE International Conference and Workshops on Automatic Face and Gesture Recognition (FG), May 2015, 5 pages, IEEE.

* cited by examiner

US 11,966,413 B2

FEDERATED ARTIFICIAL INTELLIGENCE WITH CUMULATIVE LEARNING IN A COMPUTER NETWORK

TECHNICAL FIELD

The present disclosure relates generally to computer networks, and, more particularly, to federated artificial intelligence with cumulative learning in a computer network.

BACKGROUND

Deep learning is now being leveraged across a wide range of verticals for a variety of different purposes. For example, deep learning has proven extremely effective at recognizing objects within image and video data. However, a fundamental limitation of deep learning is its lack of reasoning, i.e., the ability to leverage previously acquired knowledge to answer a new question. In other words, while a deep learning network may be trained to answer a particular question (e.g., "does this image depict a car?"), such a network is also unable to make inferences about what is depicted in the image to answer new questions (e.g., "given the traffic volume at an intersection, should the timing of the traffic light be changed?").

One branch of artificial intelligence (AI) is symbolic learning, which models what are referred to as "concepts." The interrelationships of these concepts enable the use of symbolic reasoning, which more closely resembles how a human 'thinks.' This allows the system to make inferences in a way that can be easily explained to a user. In addition, these types of reasoning systems can also expand and update their knowledge bases over time, using what is known as cumulative learning.

Unfortunately, knowledge acquisition in partially-known and dynamic environments cannot happen all at once. Indeed, purely statistical learning techniques and most popular machine learning methods are insufficient for this purpose. This is because they neither separate causal relationships explicitly nor create explicit models of their subject of study, making them unsuitable and cannot be used for real-world tasks where cumulative learning is required.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
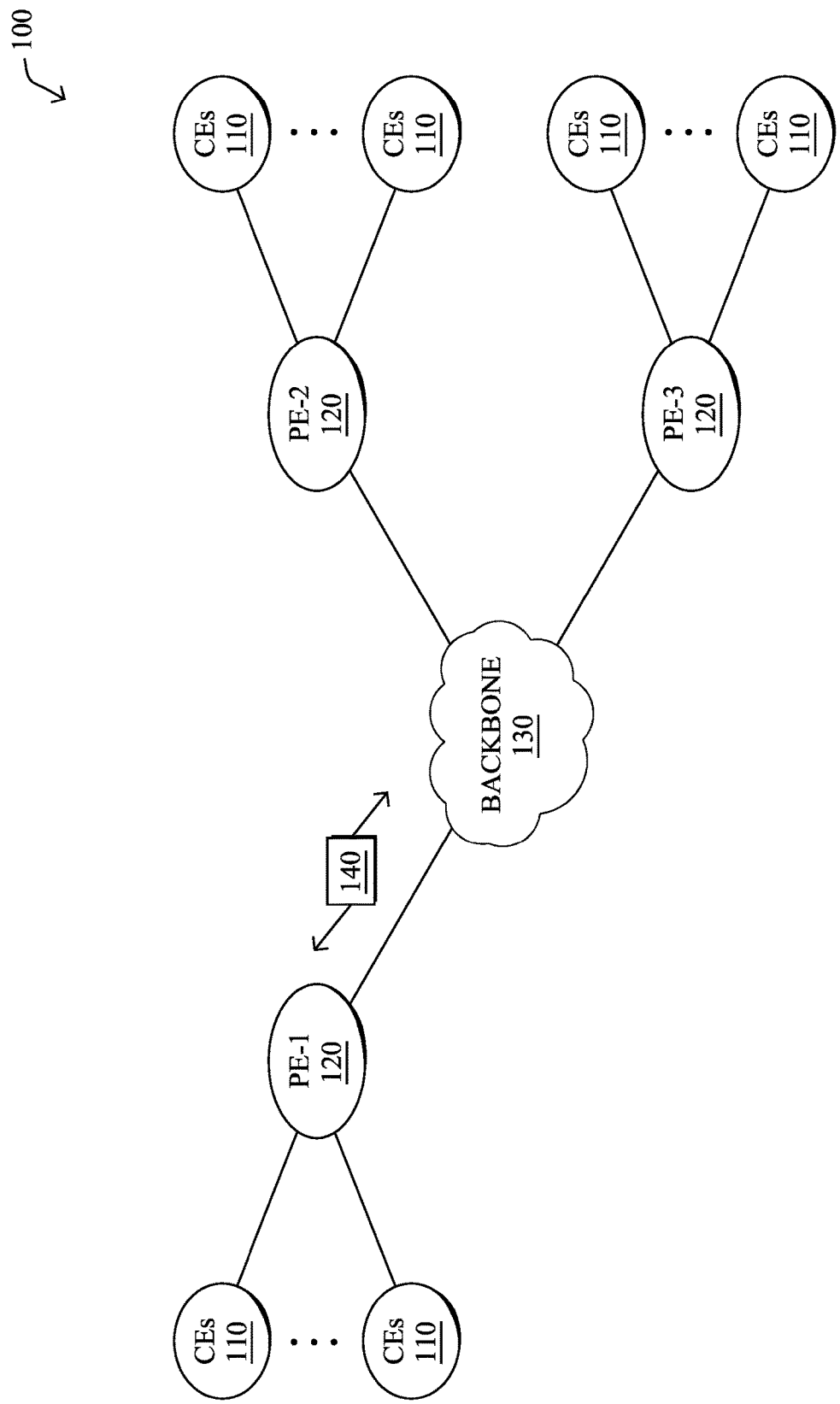
FIGS. 1A-1B illustrate an example computer network.

According to one or more embodiments of the disclosure, a first deep fusion reasoning engine (DFRE) agent in a network receives first sensor data from a first set of one or more sensors in the network. The first DFRE agent translates the first sensor data into symbolic data. The first DFRE agent applies, using a symbolic knowledge base maintained by the first DFRE agent, symbolic reasoning to the symbolic data to make an inference regarding the first sensor data. The first DFRE agent updates, based on the inference regarding the first sensor data, the knowledge base. The first DFRE agent propagates the inference to one or more other DFRE agents in the network.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
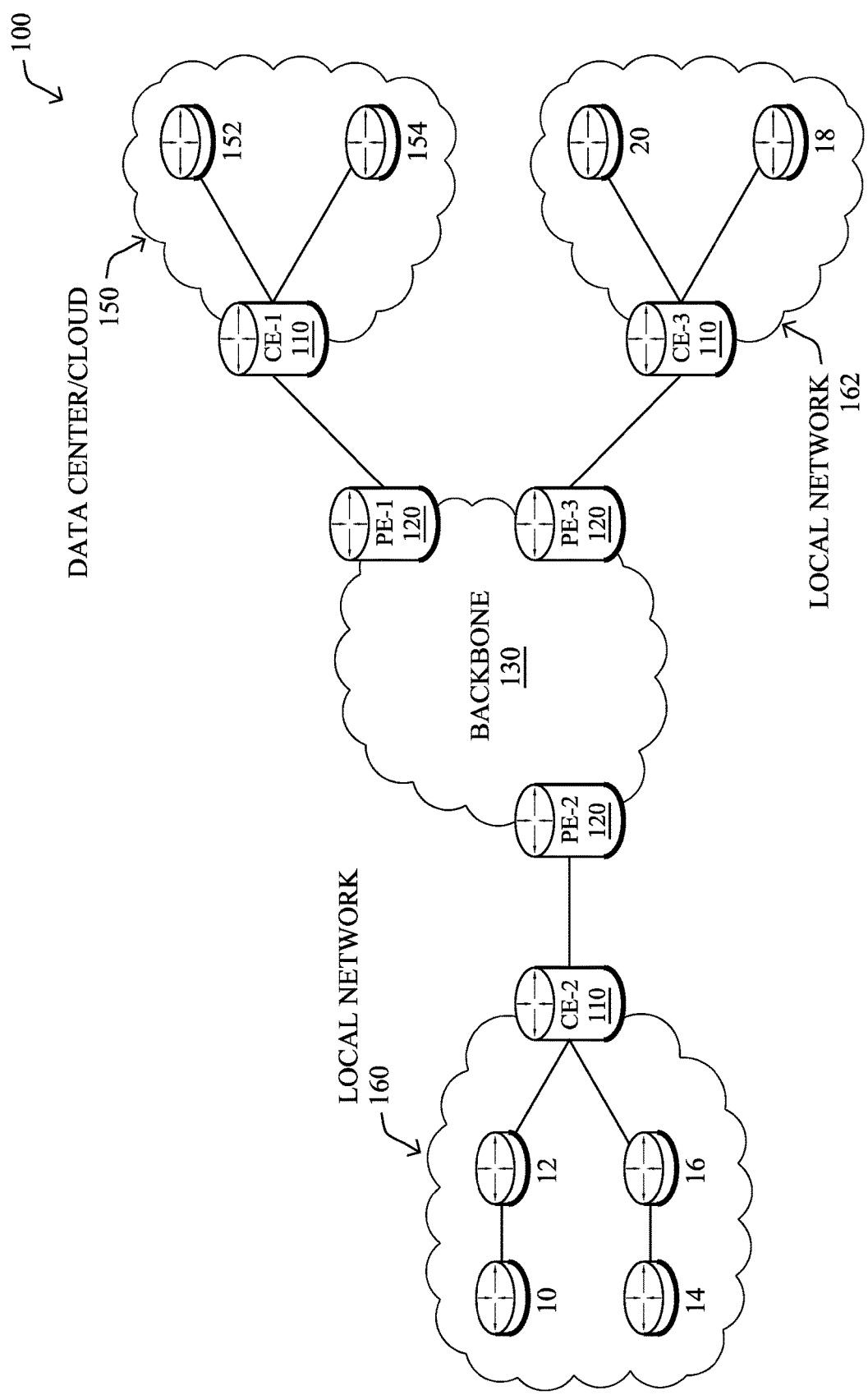

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
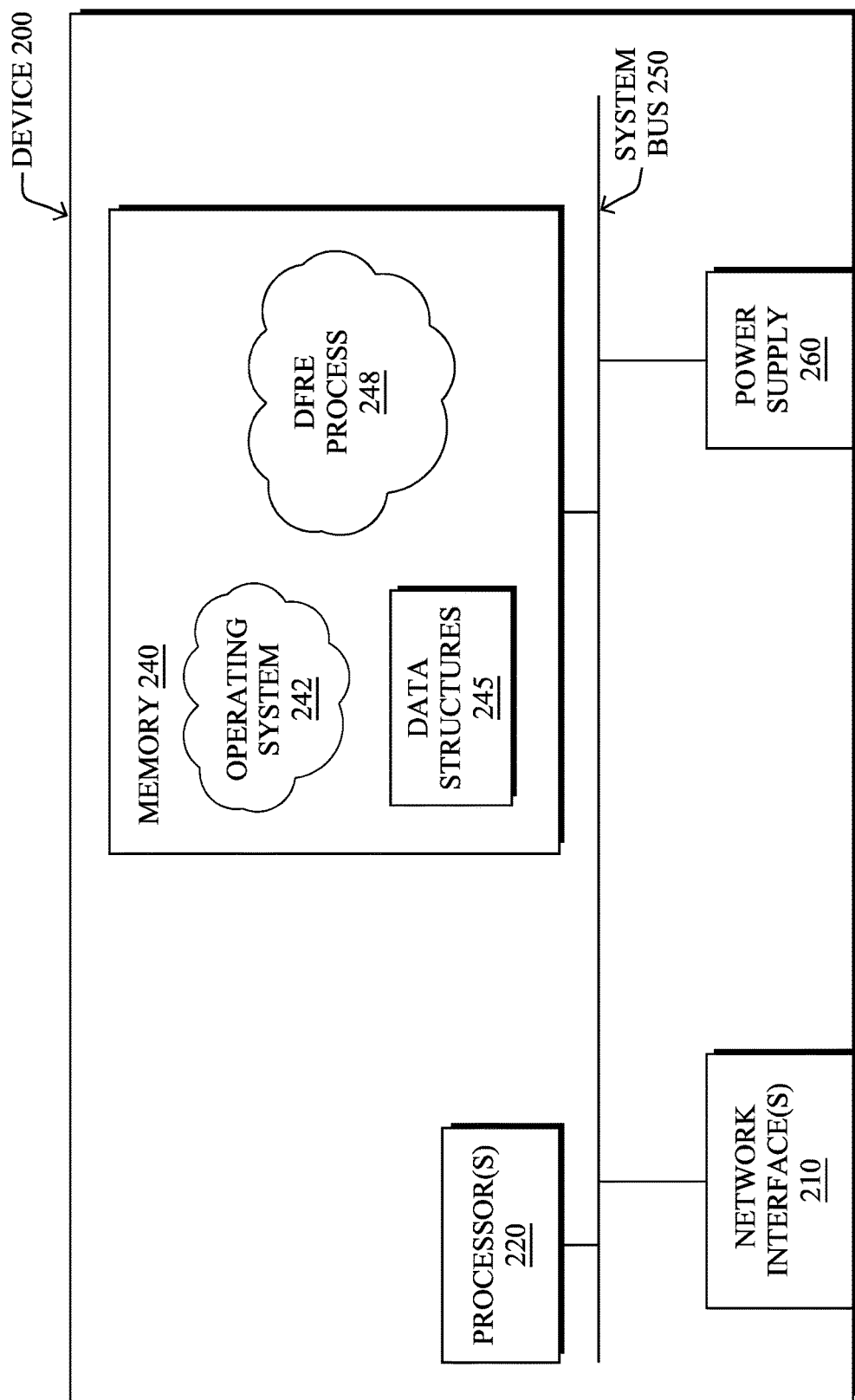
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to perform analytics in a network. In various embodiments, DFRE process 248 may utilize machine learning techniques, in whole or in part, to perform its analysis functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video stream. Conversely, the false negatives of the model may refer to the number of times the model failed to identify an object or condition within a video stream. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
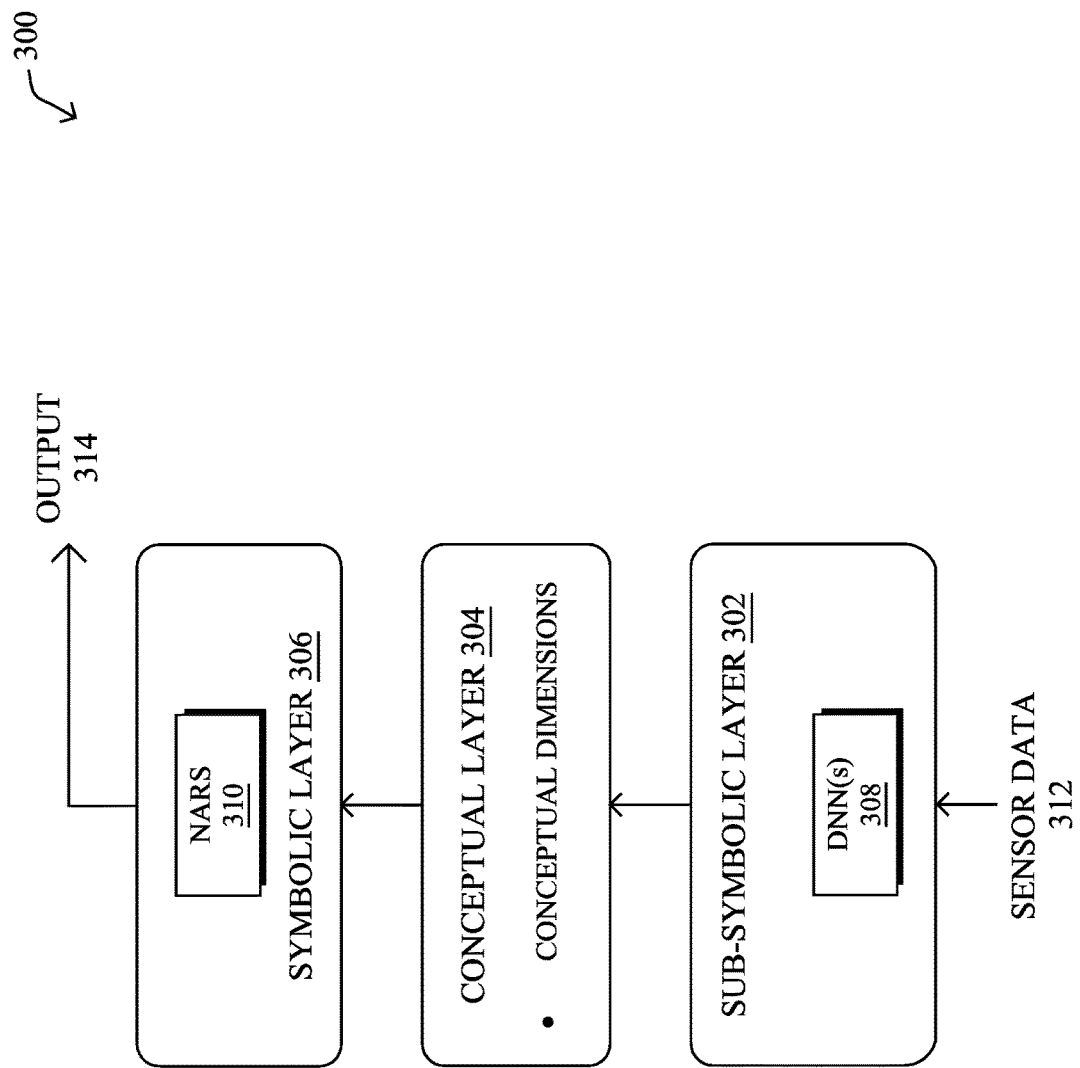
FIG. 3 illustrates an example layer hierarchy for a deep fusion reasoning engine (DFRE)

According to various embodiments, FIG. 3 illustrates an example layer hierarchy 300 for a deep fusion reasoning engine (DFRE). For example, DFRE process 248 shown in FIG. 2 may be implemented using layer hierarchy 300.

At the lowest layer of hierarchy 300 is sub-symbolic layer 302 that processes the sensor data 312 collected from the network. For example, sensor data 312 may include any number of telemetry measurements from the monitored network. In some embodiments, sensor data 312 may comprise multimodal sensor data from any number of different types of sensors located throughout the location (e.g., network telemetry collectors, video cameras or other physical sensors, etc.). At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intension" and an "extension," whereby the intension offers a symbolic way of identifying the extension of the concept. For example, consider the intension that represents motorcycles. The intension for this concept may be defined by properties such as "having two wheels" and "motorized," which can be used to identify the extension of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or connectionist representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to compute the semantic severity level of alerts.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video stream/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

Figure 4A:
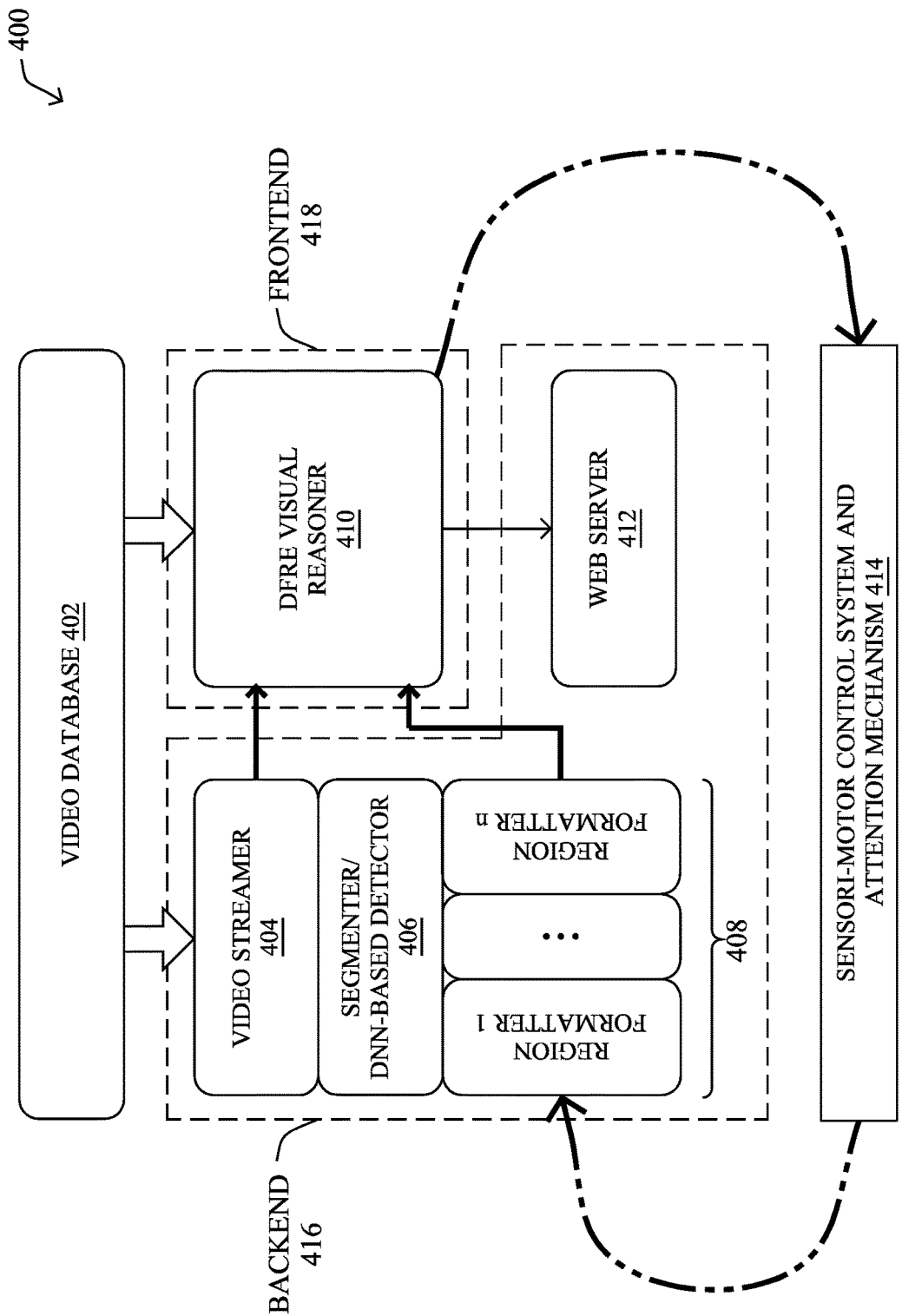
FIGS. 4A-4B illustrate example DFRE architectures.

As would be appreciated, a DFRE represents an evolution over both deep learning and symbolic reasoning by allowing both to interoperate with one another using a conceptual layer. FIG. 4A illustrates an example DFRE architecture 400 for performing video analysis. More specifically, video analysis process 248 may be implemented using DFRE architecture, to analyze the video streams/streams from any number of cameras and across any number of different locations. Further, DFRE architecture 400 may be implemented in a distributed manner or implemented as its own stand-alone service, either as part of the local network under observation or as a remote service. In addition, the functionalities of the components of architecture 400 may be combined, omitted, or implemented as part of other processes, as desired.

In general, DFRE architecture 400 represents the first functioning neuro-symbolic system that merges the power of deep learning at the sub-symbolic layer with the power of symbolic reasoning at the symbolic layer. This leads to the following benefits over current 'AI' systems:

An intelligent system which is able to solve general video analysis problems under the assumption of insufficient knowledge and resources (AIKR)
Seed ontology based self-supervised and active learning
Experienced based learning by reasoning
Vastly richer knowledge representation than ML/DL/rules engines/programming languages
True data fusion across higher levels of abstraction (sub-symbolic/symbolic)
Ability to handle one-shot learning for low probability of occurrence events or tail events
Explainable outputs
Ability to go beyond statistical learning limitations with causal modeling
Efficient resource utilization and can run on low power edge CPU's More specifically, in the proposed general DFRE architecture 400, a video database 402 may be populated with raw video frames captured by any number of cameras located in a particular place. Such video data may then be analyzed by a deep learning backend 416, or processed on-line using in-memory data storage frameworks, to prepare the sub-symbolic input data to be processed by a symbolic reasoner, DFRE visual reasoner 410, at the frontend 418 of architecture 400.

In particular, when a generic description is needed for a frame in video database 402, backend 416 of DFRE architecture 400 will first divide the video frame(s) into different portions. In some embodiments, backend 416 may include a video streamer 404 capable of streaming the video data according to any number of streaming protocols. For example, video streamer 404 may support any or all of the following streaming protocols:

Dynamic Adaptive Streaming over HTTP (DASH)
HTTP Live Streaming (HLS)
Real Time Streaming Protocol (RTSP)
etc.

In turn, a segmenter/DNN-based detector 406 may apply one or more machine learning models, such as a DNN-based model, to the streamed video data from video streamer 404, to identify classes/objects present in different portions of the video data. In some embodiments, detector 406 may do so by segmenting the video data into regions described by regionlets, using n-number of region formatters 408. Such regionlets may represent segmented regions of hierarchical/nested attributes for known or unknown classes/objects present within different portions of a video frame. For example, segmenter/DNN-based detector 406 may leverage its machine learning model to determine that a milk jug is present in the top left corner of the video frames.

Figure 4B:
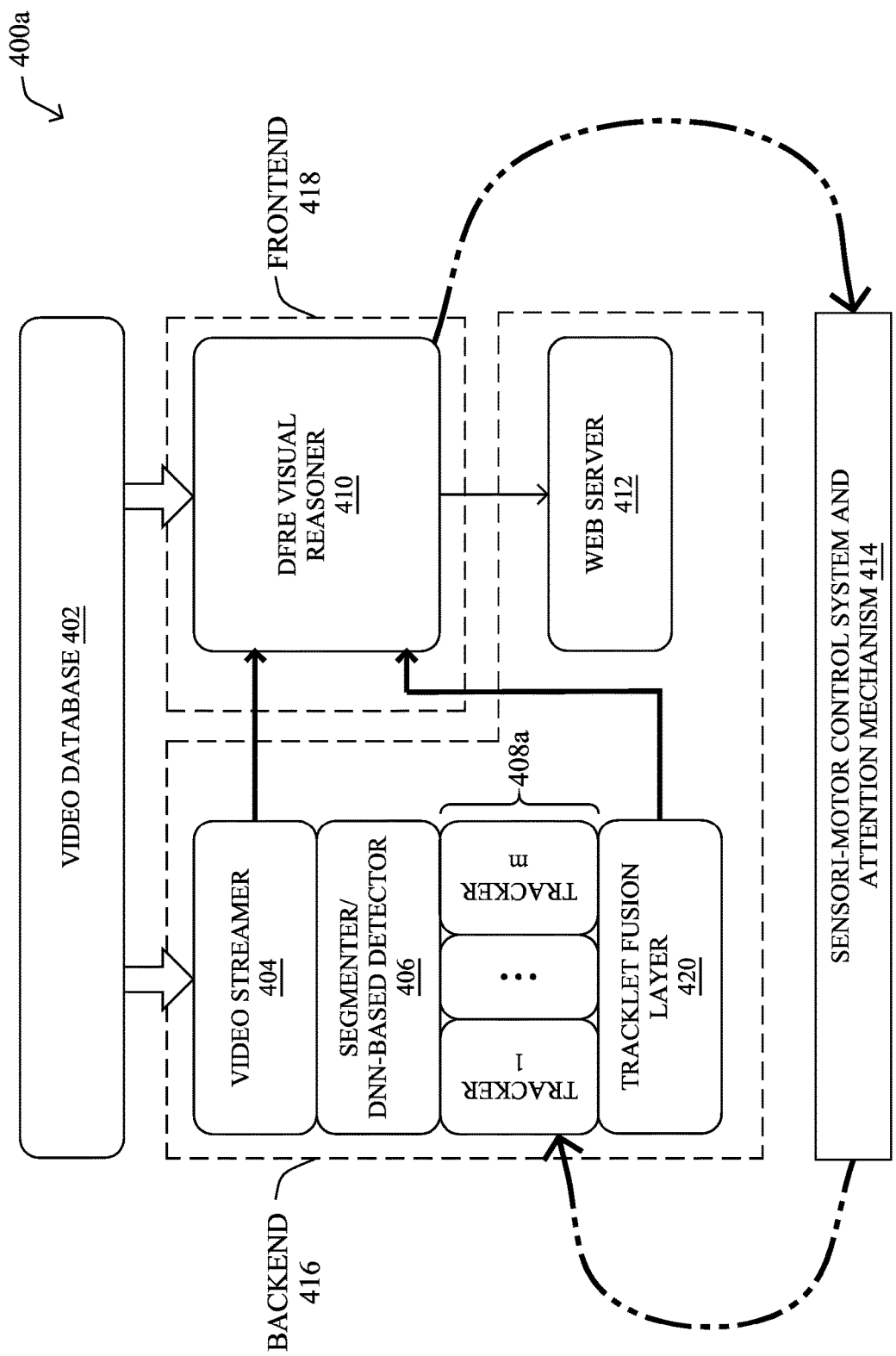

In an alternate or supplemental implementation, as shown in architecture 400a in FIG. 4B, segmenter/DNN-based detector 406 may also assess tracklets present in the video data, i.e., segments of dynamic trajectories for the various classes/objects. To do so, backend 416 may also include m-number of trackers 408a, as well as a tracklet fusion layer 420. Such tracklet analysis allows backend 416 to also perform spatio-temporal analysis on the video data by tracking specific objects found in the video data. For example, in the case of a video stream of a street, segmenter/DNN-based detector 406 may identify and track a moving vehicle over time across a number of different frames from the video stream data from video streamer 404.

Example systems that may be suitable to implement segmenter/DNN-based detector 406 include YOLOv3, MobileNet, RetinaNet, and the like, to detect classes/objects for tracklets, and DeepMask, Path Aggregation Network (PANet), etc., to discover various regions within a segmentation mask for regionlets of a given video frame. For tracklet generation and fusion, Multiclass multi-object tracker (MC-MOT) has proven to be suitable, during testing.

The components of backend 416 may operate in conjunction with one another to provide frontend 418 with the outputs of the DNN model(s) for processing by DFRE visual reasoner 410. More specifically, and in accordance with the DFRE architecture 300 described previously, DFRE visual reasoner 410 may use a conceptual layer/space to map the output to symbols for analysis by a symbolic reasoner. In turn, DFRE visual reasoner 410 may make use symbolic reasoning to make inferences about the video data and, in turn, send alerts to a user interface. For example, DFRE visual reasoner 410 may send an alert to web server 412 for display in conjunction with the video data (e.g., as an overlay on the video frames).

Figure 5:
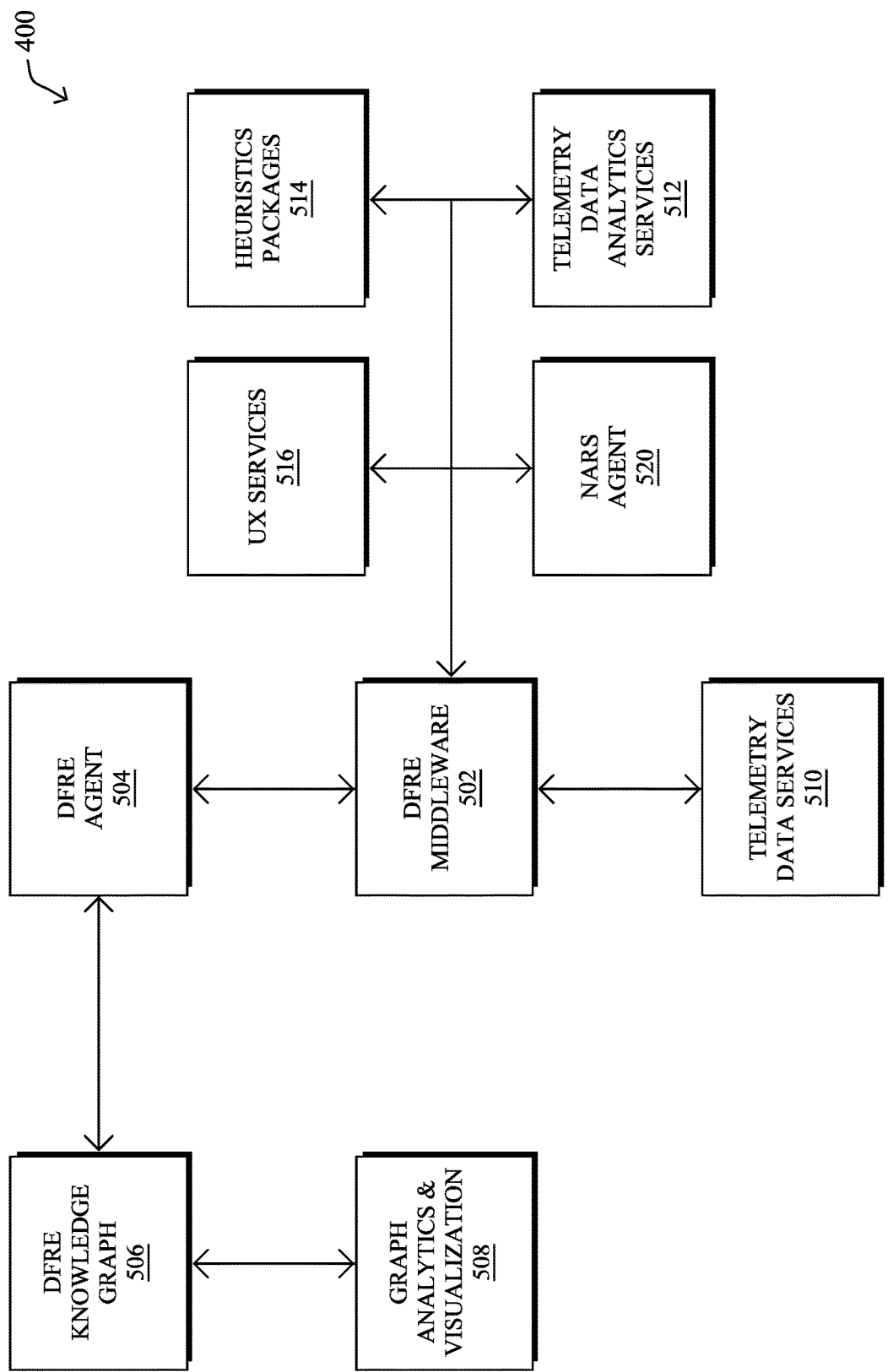
FIG. 5 illustrates an example framework for implementing DFRE services in a network.

FIG. 5 illustrates an example framework for implementing DFRE services in a network, according to various embodiments. As would be appreciated, DFRE architectures 400-400a may be implemented across any number of devices, either in the network in which the sub-symbolic sensor data is captured, partially at a remote location (e.g., in the cloud), or fully remote to that network.

At the core of framework 500 may be DFRE middleware 502 that offers a collection of services, each of which may have its own interface. In general, DFRE middleware 502 may leverage a library for interfacing, configuring, and orchestrating each service of DFRE middleware 502.

In one embodiment, the services provided by DFRE middleware 502 may telemetry data services 510, which are used to collect various forms of telemetry data from the network. For example, telemetry data services 510 may collect telemetry data regarding the network via probing, Netflow or IPFIX records, log information, model driven telemetry (MDT) and/or event-driven telemetry (e.g., Yang data), device information, or the like. In further embodiments, telemetry data services 510 may gather sensor data from any number of sensors distributed throughout the network. For example, telemetry data services 510 may capture video data, temperature data, humidity data, etc. from various physical sensors in the network.

The services provided by DFRE middleware 502 may also include telemetry data analytics services 512, which perform analytics on the telemetry data collected by network telemetry data services 510. For example, telemetry data analytics services 512 may apply any number of predefined rules to the telemetry data gathered by telemetry data services 510. In some embodiments, services 512 may also use machine learning, to assess the collected telemetry data.

According to various embodiments, DFRE middleware 502 may also make use of any number of heuristic packages 514. In general, a heuristic package may comprise a set of evaluation rules and one or more subservices to be monitored in the network. More specifically, a heuristic package may indicate the subservices (e.g., subservices of telemetry data services 510) that are to be used to monitor specific metrics or data in the network. In addition, a heuristic package may also include the rules to be evaluated by telemetry data analytics services 512. For example, a particular rule may specify a threshold for a metric monitored by a subservice and may, in some cases, also specify a corresponding action (e.g., raising an alert, etc.).

DFRE middleware 502 may also provide user experience (UX) services 516, which may allow a user to report experienced network problems or the like. For example, if a user indicates a problem (e.g., a video conference keeps freezing), this may trigger the various components of framework 500 to try and diagnose the problem.

In various embodiments, DFRE middleware 502 may also provide services to support semantic reasoning, such as by an AIKR reasoner. For example, as shown, DFRE middleware 502 may include a NARS agent 520 that performs semantic reasoning for structural learning. In other embodiments, OpenCog or another suitably semantic reasoner could be used.

One or more DFRE agents 504 may interface with DFRE middleware 502 to orchestrate the various services available from DFRE middleware 502. In addition, DFRE agent 504 may feed and interact with the AIKR reasoner so as to populate and leverage a DFRE knowledge graph 506 with knowledge. For example, DFRE agent 504 may perform semantic graph decomposition on DFRE knowledge graph 506, so as to compute a graph from knowledge graph 506 that addresses a particular problem. DFRE agent 504 may also perform post-processing on DFRE knowledge graph 506, such as performing graph cleanup, applying deterministic rules and logic to the graph, and the like. DFRE agent 504 may also employ a definition of done, to check goals and collect answers using DFRE knowledge graph 506.

In general, DFRE knowledge graph 506 may comprise any or all of the following:
  Data
  Ontologies
  Evolutionary steps of reasoning
  Knowledge In other words, DFRE knowledge graph 506 acts as a dynamic and generic memory structure. In some embodiments, DFRE knowledge graph 506 may also allow different reasoners to share or coalesce knowledge, have their own internal sub-graphs, and/or work collaboratively in a distributed manner. For example, a first DFRE agent 504 may perform reasoning on a first sub-graph, a second DFRE agent 504 may perform reasoning on a second sub-graph, etc., to evaluate the health of the network and/or find solutions to any detected problems. To communicate with DFRE agent 504, DFRE knowledge base 506 may include a bidirectional Narsese interface or other interface using another suitable grammar.

In various embodiments, DFRE knowledge graph 506 can be visualized on a user interface via graph analytics and visualizations 508. For example, Cytoscape, which has its building blocks in bioinformatics and genomics, can be used to implement graph analytics and visualizations 508.

Figure 6:
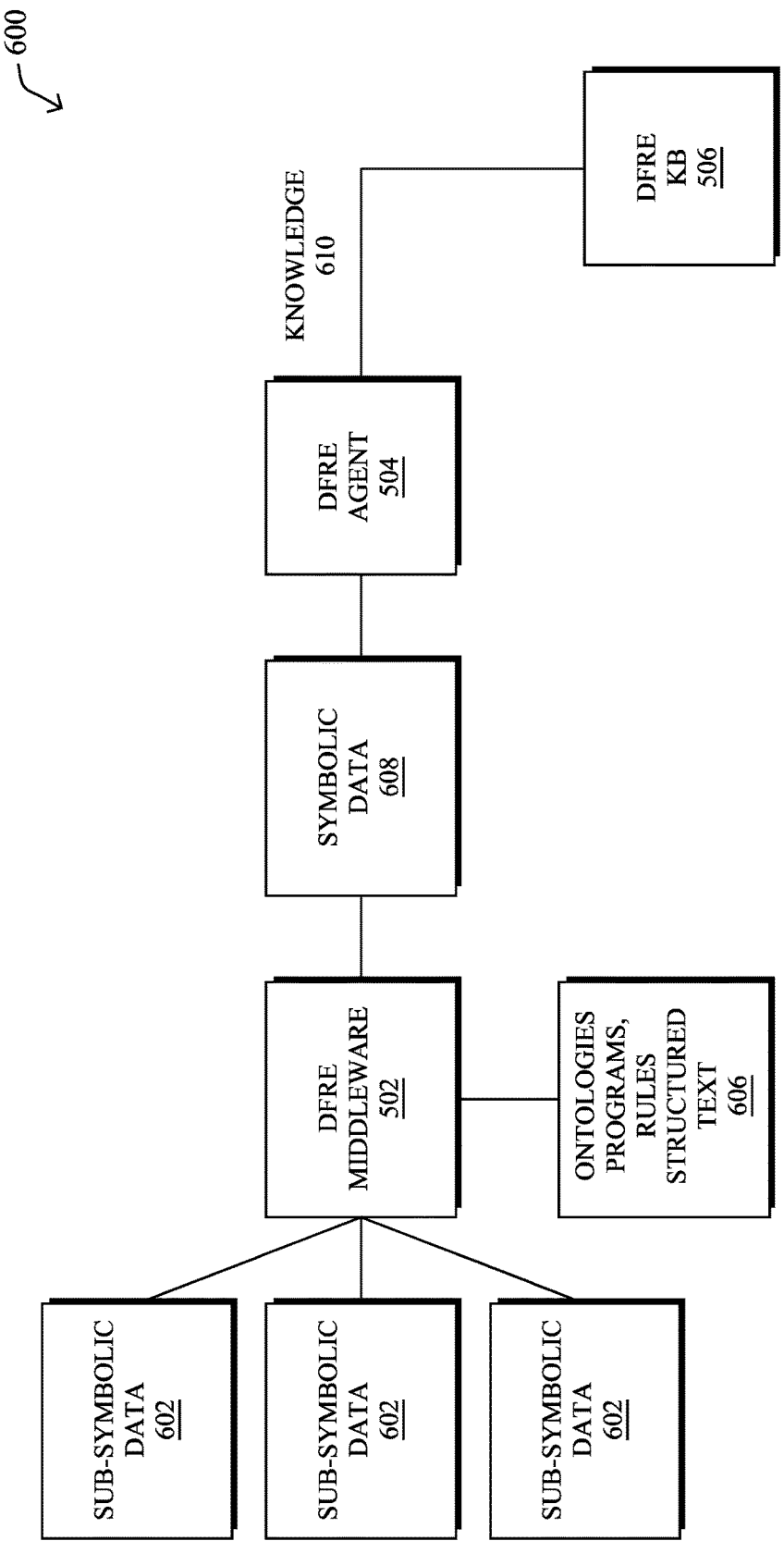
FIG. 6 illustrates an example of populating a DFRE knowledge base.

FIG. 6 illustrates an example 600 of the interactions of the various components of the DFRE framework 500 of FIG. 5, according to various embodiments. As shown, sub-symbolic data 602 (e.g., sensor data, various telemetry data metrics, statistics, etc.) can be captured by DFRE middleware 502 from the network. In turn, DFRE middleware 502 may leverage various ontologies, programs, rules, and/or structured text 604 to translate sub-symbolic data 602 into symbolic data 606.

DFRE agent 504 may apply symbolic reasoning to the symbolic data 606 provided by DFRE middleware 502, to populate and update DFRE knowledge base (KB) 506 with knowledge 608 acquired from the network. In addition, DFRE agent 504 can leverage the stored knowledge 510 in DFRE KB 506 to make assessments and inferences about the network.

As noted above, a DFRE links the sub-symbolic processing of deep learning with a symbolic reasoning layer, thereby allowing the system to make much more powerful inferences about the input data, but also in a way that is explainable to a user. While DFRE framework 500 is suitable in litany deployments, the use of a centralized knowledge base by a single DFRE agent can be overly cumbersome. Indeed, knowledge acquisition in partially-known and dynamic environments cannot happen all at once. To this end, the DFRE system may leverage cumulative learning, which deals with systematically integrating new knowledge and skills effectively and efficiently that improve over time, leaving all knowledge untouched but that which is required in light of the new knowledge added. However, purely statistical learning techniques, and most popular machine learning methods, are insufficient for this purpose because they neither separate causal relationships explicitly nor create explicit models of their subject of study, and cannot be used for real-world tasks where cumulative learning is required.

Cumulative learning is particularly challenging to implement in a federated/distributed manner. Indeed, existing approaches to cumulative learning typically assume that each learning agent is honest, well-functioning, has access to the other agents' prior beliefs (or ontologies), and is not naturalized (i.e., that the agent is not part of its environment).

Federated Artificial Intelligence with Cumulative Learning in a Computer Network The techniques herein introduce a DFRE-based framework that allowed for federated learning by a plurality of DFRE agents, while also supporting cumulative learning between the agents. In some aspects, this allows the DFRE agents to maintain their own knowledge bases and apply them to their own corresponding input data. For example, one DFRE agent may assess sensor data from a first sensor, while another DFRE agent may assess sensor data from another sensor in the network. Both agents may make their own inferences regarding their respective input datasets and, under certain conditions, share their inferences with one another.

Illustratively, the techniques described herein may be performed by hardware, software, and/or firmware, such as in accordance with the DFRE process 248, which may include computer executable instructions executed by the processor 220 (or independent processor of interfaces 210), to perform functions relating to the techniques described herein.

Specifically, in various embodiments, a first deep fusion reasoning engine (DFRE) agent in a network receives first sensor data from a first set of one or more sensors in the network. The first DFRE agent translates the first sensor data into symbolic data. The first DFRE agent applies, using a symbolic knowledge base maintained by the first DFRE agent, symbolic reasoning to the symbolic data to make an inference regarding the first sensor data. The first DFRE agent updates, based on the inference regarding the first sensor data, the knowledge base. The first DFRE agent propagates the inference to one or more other DFRE agents in the network.

Figure 7:
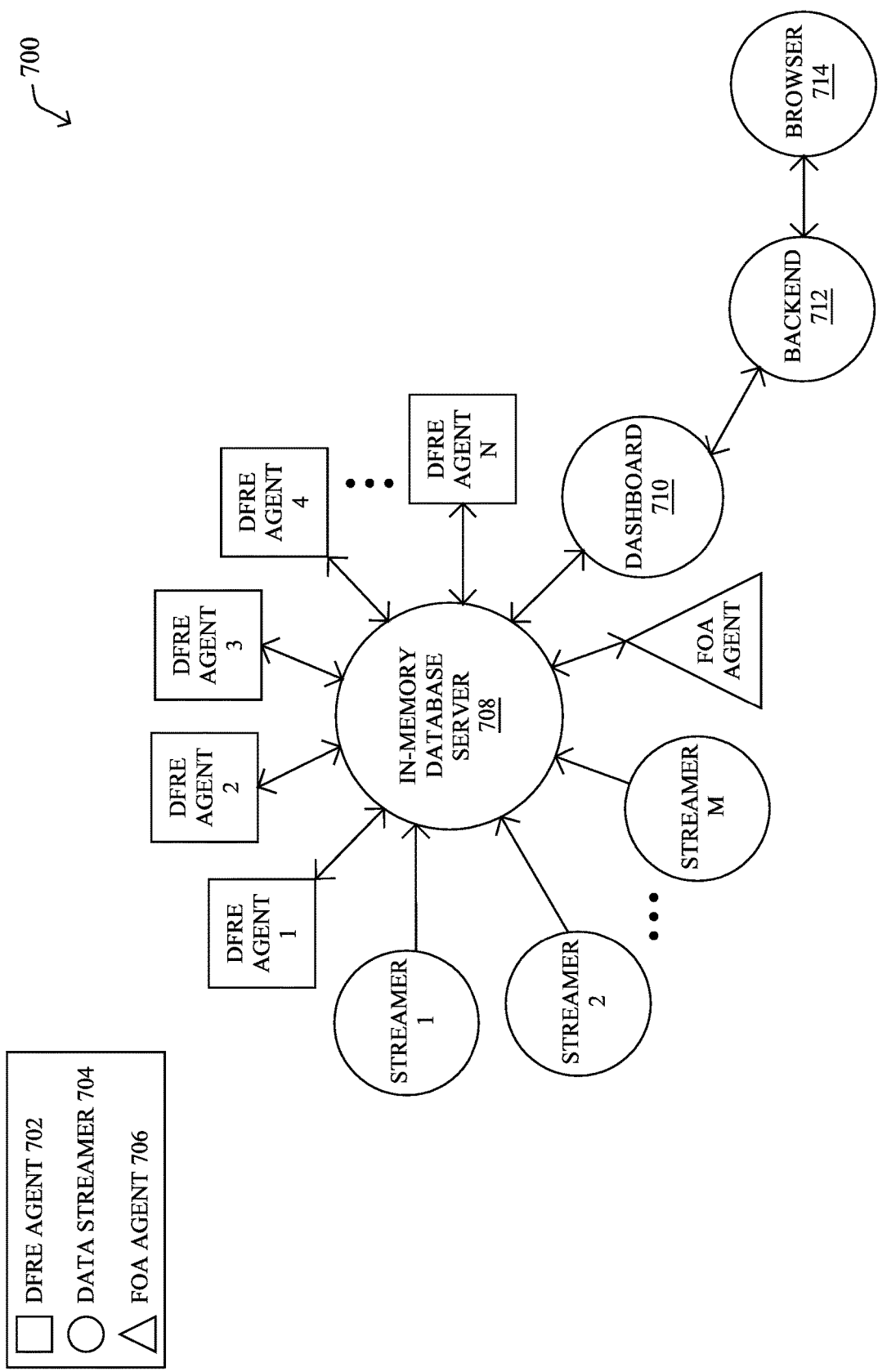
FIG. 7 illustrates an example network architecture for federated artificial intelligence with cumulative learning.

Operationally, FIG. 7 illustrates an example network architecture 700 for federated artificial intelligence with cumulative learning, according to various embodiments. As shown, architecture 700 may include any or all of the following components: a plurality of DFRE agents 702 (e.g., a first through N-number of DFRE agents), a plurality of data streamers 704 (e.g., a first through M-number of data streamers), a focus of attention (FOA) agent 706, an in-memory database server 708, a dashboard agent 710, a visualization backend 712, and a browser 714. As would be appreciated, components 702-714 may be implemented in a federated manner across any number of physical devices in the network. In further cases, some of components 702-714 may also reside external to the local network. For example, FOA agent 706, database server 708, dashboard 710, backend 712, and/or browser 714 may be executed on one or more remote devices, such as in the cloud, a data center, or the like. In addition, any of components 702-714 may implement any of the functionalities described previously with respect to architectures 400-400a and framework 500.

In general, each data streamer 704 may be a source of sensor data in the network. For example, in the case of a surveillance system, each data streamer 704 may correspond to a different camera that generates video stream data at different physical locations. More generally, framework 700 can be implemented for any number of use cases to assess sensor data generated at various locations in the network. Accordingly, data streamers 704 may be any form of device that takes measurements in the network. For example, in the case of architecture 700 providing network assurance to the network, data streamers 704 may include network telemetry exporters that capture and export telemetry data regarding the operation of the network (e.g., resource consumptions, link state information, etc.).

As the core of architecture 700 may be in-memory database server 708 that functions as a fast, in-memory, key-value datastore for use as a database, cache, message broker, and/or queue. For example, in-memory database server 708 may be a Redis server or other suitable storage and messaging platform that implements a publish/subscribe messaging paradigm whereby senders (publishers) are not programmed to send their messages to specific listeners (subscribers). On the contrary, messages published to server 708 may be characterized into channels, without a publisher knowing which listeners (subscribers) exist or are available. Listeners express interest in one or more channels, and only receive messages that are of interest. This decoupling of publishers and subscribers can allow for greater scalability and a more dynamic network topology.

Located in network 700 may be any number of DFRE agents 702 that are configured to assess sensor data captured by data streamers 704. In various embodiments, each DFRE agent 702 may have a corresponding set of one or more data streams 704 from which it receives and analyzes sensor data. This can be achieved, for example, by each data streamer 704 publishing its sensor data to database server 708 and its corresponding DFRE agent 702 listening for these messages. By publishing the sensor data to different channels, the sensor data can be partitioned to form pairs of one or more data streamers 704 and one or more DFRE agents 702.

According to various embodiments, each DFRE agent 702 may maintain its own knowledge base and use semantic reasoning to make inferences about the sensor data that it receives from its associated data streamer(s) 704 via the messages published to server 708. For example, in some embodiments, each DFRE agent 702 may transform the sub-symbolic sensor data from its corresponding data streamer(s) 704 into symbolic data, either locally, or leveraging an intermediate service. In turn, the DFRE agent 504 may use its knowledge base (e.g., an ontology) and an AIKR reasoner to apply symbolic reasoning to the symbolic data, to make inferences about the sensor data.

Also as shown, architecture 700 may also include FOA agent 706 that is responsible for providing a sensor-motor control and attention mechanism for the DFRE agents 702 in architecture 700. For example, FOA agent 706 may subscribe to messages published by DFRE agents 702 to database server 70. Thus, when a DFRE agent 702 indicates that a particular event has occurred, FOA agent 706 may assess the published event, determine a FOA suitable for the event, and publish instructions to other DFRE agents 702 via database server 708, accordingly.

Another key functionality of architecture 700 is the ability for a user to quickly visualize the inferences made by DFRE agents 702, as well as the chain of reasoning that led to these inferences. To this end, architecture 700 may also include a dashboard agent 710 that provides visualization data to a browser 714 via backend 712. For example, visualization data may be provided to browser 714 via Graphite, a utility that allows visualization of time-series data, StatsD, a daemon that aggregates statistics/metrics, or any other suitable visualization utilities.

As would be appreciated, each DFRE agent 702 may have its own objective reality in the domain of interest (domain knowledge) and knowledge about how to use the domain knowledge to achieve various goals (problem-solving knowledge). Accordingly, the knowledge bases of each DFRE agent 702 may be initiated using a seed ontology that triggers the reasoning process and represents information, so as to define the meaning of terms and their relationships in a consistent manner across architecture 700. Doing so allows the DFRE agents 702 to share a common mode of communication and allow for bootstrapping the cognitive system on a specific scenario.

To enable cumulative learning and data sharing between the various DFRE agents 702, DFRE agents 702 may share acquired knowledge with one another by publishing messages to server 708 and subscribing to messages published by other DFRE agents 702 of interest. In general, cumulative learning involves three phases: 1.) acquiring new knowledge models, 2.) evaluating the performance of existing ones, and 3.) controlling the learning activity.

Acquiring new knowledge models is pattern extraction and entails identifying causal relationships between input pairs. Model acquisition is triggered by either the unpredicted success of a goal, or the failure of a prediction. For example, assume that DFRE agent 1 shown makes a new inference regarding its input sensor data using its reasoning engine and may update its knowledge base, accordingly.

Once the DFRE agent 702 has produced a model, it may monitor the performance of the new model. If the model is unreliable, the DFRE agent 702 may delete the unreliable model. Otherwise, the DFRE agent 702 may share its acquired knowledge with other DFRE agents 702 in network 700 and update its own knowledge base, accordingly.

Finally, both model acquisition and revision control depend on the limited resources that can be allocated and may be driven by the reasoning system so as to optimize their operations. As a result, the system is forced by design to continuously learn, based on its experience, about its progress in modeling inputs.

As a use case example, assume that data streamers 704 are video cameras located throughout a smart city, each camera generating its own video stream and publishing that feed to database server 708. In turn, DFRE agents 702 (e.g., executed on routers or other devices in the network) may receive the video streams to which they are subscribed from server 708. Now, assume that DFRE agent 1 shown analyzes the video stream using is semantic reasoner and makes an inference that a hit-and-run event has occurred (i.e., an event of interest).

To track the hit-and-run driver throughout the city, DFRE agent 1 may publish the inference as a message to database server 708. In turn, FOA agent 706, which is subscribed to the channel to which the message was published, will learn that a hit-and-run even has occurred. In turn, FOA agent 706 may identify the responsible video in the initial video and make the vehicle the focus of attention for other DFRE agents 706 by publishing a message to database server 708. For example, such a message may indicate the initial inference that a hit-and-run has occurred, information that can be used to help identify the vehicle, etc. As a result, other DFRE agents 702 may update their knowledge bases and begin looking for the vehicle in the video streams from their associated data streams 704. In doing so, the hit-and-run vehicle can be tracked by the DFRE agents 702 across the various camera views available throughout the city. In addition, dashboard 710 may also provide the video streams in which the vehicle was detected to browser 714, allowing a user to continue to track the whereabouts of the vehicle.

Note that various approaches are possible with respect to implementing cumulative learning in architecture 700. In a simple case, a brute force approach can be used whereby all new inferences by DFRE agents 702 are publish and coalesced. However, this may not scale well in some implementations, but can still be useful in smaller networks.

In another embodiment, the DFRE agents 702 may employ an intermediate approach whereby a DFRE agent 702 uses a computed metric to filter out the publication of certain inferences. For example, a DFRE agent 702 may compute the length of the chain of reasoning associated with the inference and compare it to a threshold. If the length exceeds the threshold, the DFRE agent 702 may suppress reporting the inference to database server 708. Conversely, if the length is below the threshold, the DFRE agent 702 may determine that the inference should be propagated to the other DFRE agents 702 (and to FOA agent 706), accordingly.

In a further embodiment, the DFRE agent 702 may determine a class of event associated with its inference determine whether to propagate the inference to other DFRE agents 702 based on the class. This can be achieved by using a common seed ontology across the DFRE agents 702, so that they can recognize the different event types at a high level. In other cases, the DFRE agent 702 may publish the inference to a channel that coincides with the determined class of event, allowing the different agents to subscribe only to events of interest.

As would be appreciated, the above examples are illustrative in nature and one skilled in the art can adapt the DFRE-based framework herein to assess any number of different scenarios.

Figure 8A:
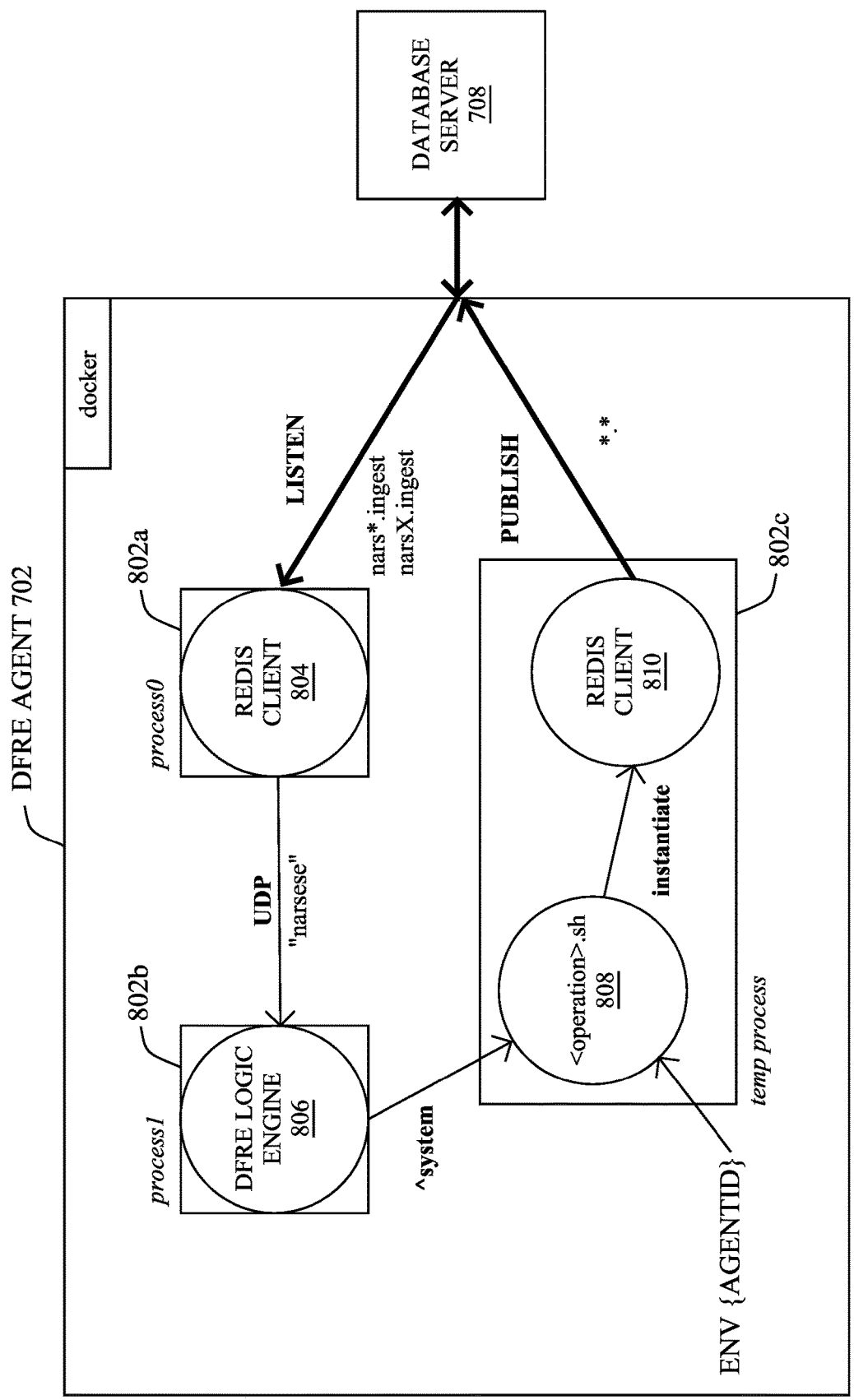
FIGS. 8A-8C illustrate example architectures for federated learning agents.
Figure 8B:
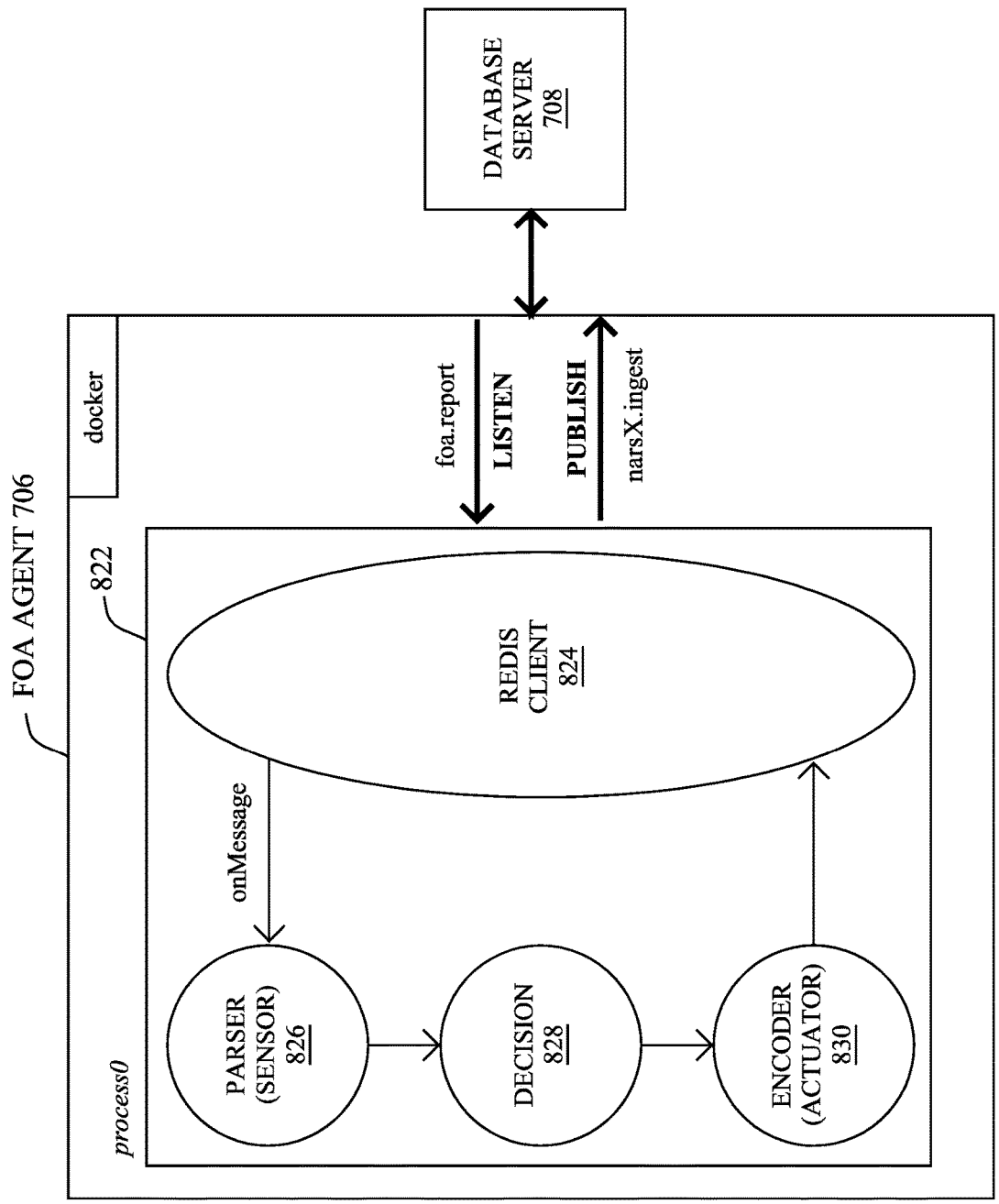
Figure 8C:
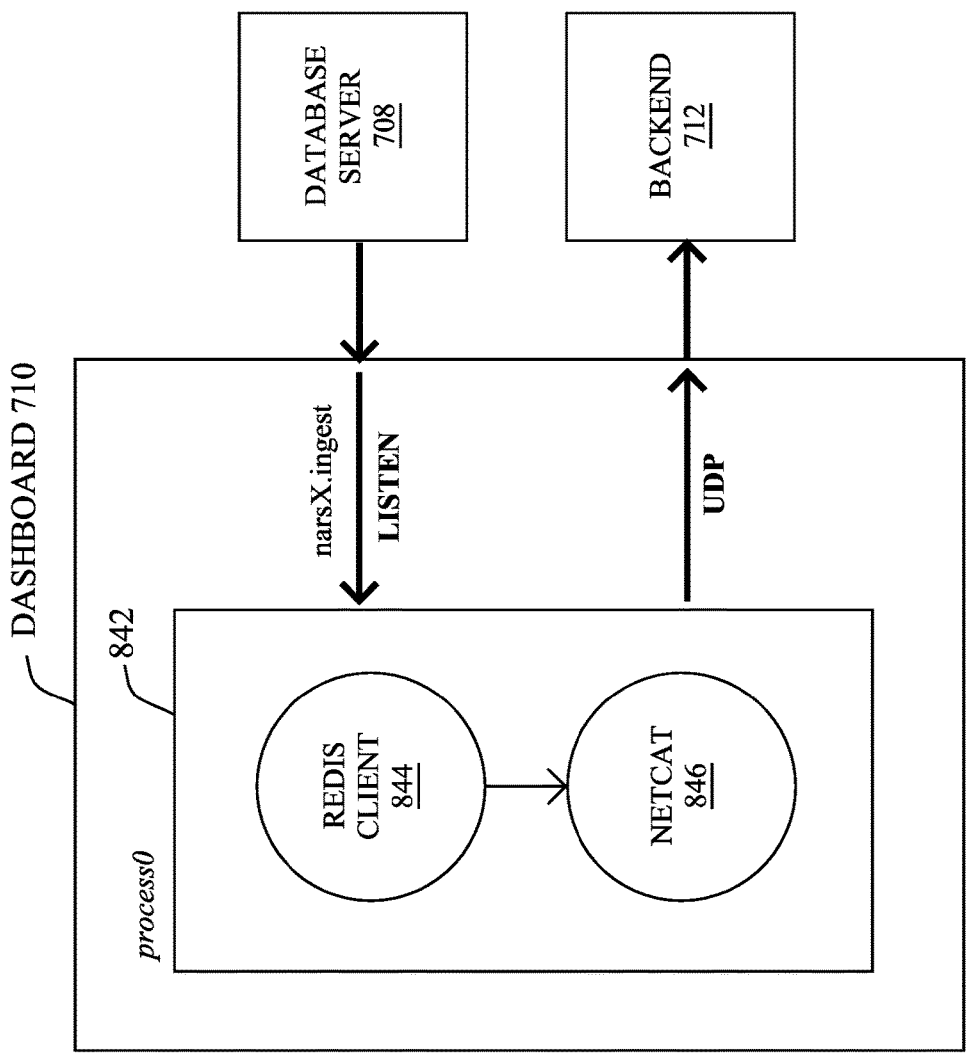

FIGS. 8A-8C illustrate example architectures for federated learning agents, according to various embodiments. More specifically, FIGS. 8A-8C illustrate example architecture for a DFRE agent 702, an FOA agent 706, and dashboard 710, respectively.

As shown in FIG. 8A, DFRE agent 702 may be executed in a software container (e.g., a Docker container) or other virtualized/abstracted environment. A first process 802*a*, process0, may execute a Redis client 804 that subscribes to certain channels of database server 708. As would be appreciated, other messaging clients could also be used, depending on which platform is selected to implement database server 708. In doing so, Redis client 804 may listen for messages that are published to database server 708 by other DFRE agents 702, data streamers 704, FOA agent 706, etc.

As shown, the published messages may be written in Narsese, which is the formal language/grammar used by NARS. Of course, other grammars could also be used for the Redis messages, depending on the reasoning engines selected for the DFRE agents 702.

DFRE agent 702 may also execute its DFRE logic engine 806 in a separate process 802*b* within its container. In other words, DFRE agent 702 may include its own reasoning engine (e.g., an AIKR reasoner) and knowledge base, which can be initiated using a seed ontology.

When Redis client 804 receives a message from database server 708, it may send the message on to DFRE logic engine 806, e.g., via a UDP message or the like. This is allows DFRE logic engine 806 to process the message using its knowledge base and reasoner in DFRE logic engine 806. For example, assume that the message indicates a particular vehicle has been involved in a hit-and-run. In such a case, DFRE logic engine 806 may update its knowledge base and begin looking for the vehicle in the video streams that it receives.

To publish messages to database server 708, a temporary process 802c may also be executed in the container of DFRE agent 702. In other words, when DFRE logic engine 806 is to publish a message to database server 708 (e.g., when it makes an inference that a particular type of event has occurred), it may spawn process 802c. In turn, a shell script 808 may instantiate a corresponding Redis client 810 that published the message to database server 708.

FIG. 8B illustrates an example architecture for FOA agent 706, according to various embodiments. Similar to DFRE agent 702, FOA agent 706 may be executed in a Docker container or the like. Within the container may be a process 822 in which a Redis client 824 is executed. Redis client 824 may subscribe to channels in database server 708 and listen for foa_report messages that report on inferences/events from the DFRE agents 702. For example, such a message may report on a hit-and-run event detected by one of the DFRE agents 702 and published to database server 708.

Redis client 824 may forward the received message on to a parser 826 that makes a decision 828 regarding the message, which is also executed within process 822. In turn, based on decision 828, an encoder may send corresponding instructions back to Redis client 824. Redis client 824 then published the resulting message back to database server 708 for forwarding on to the interested/subscribed DFRE agents 702.

FIG. 8C illustrates an example architecture for dashboard 710, according to various embodiments. Also similar to agents 702 and 706, dashboard 710 may be executed in its own container or other isolated environment. Within the container may be a process 842 in which a Redis client 844 is executed. Redis client 844 may subscribe to messages published to database server 708 and listen for them. When a message is received by Redis client 844, it may forward the message to one or more visualization utilities for forwarding on to browser 714 via backend 712. For example, as shown, Redis client 844 may send the message data to Netcat, which forward the message data on to the browser via a UDP-based message or the like.

Figure 9:
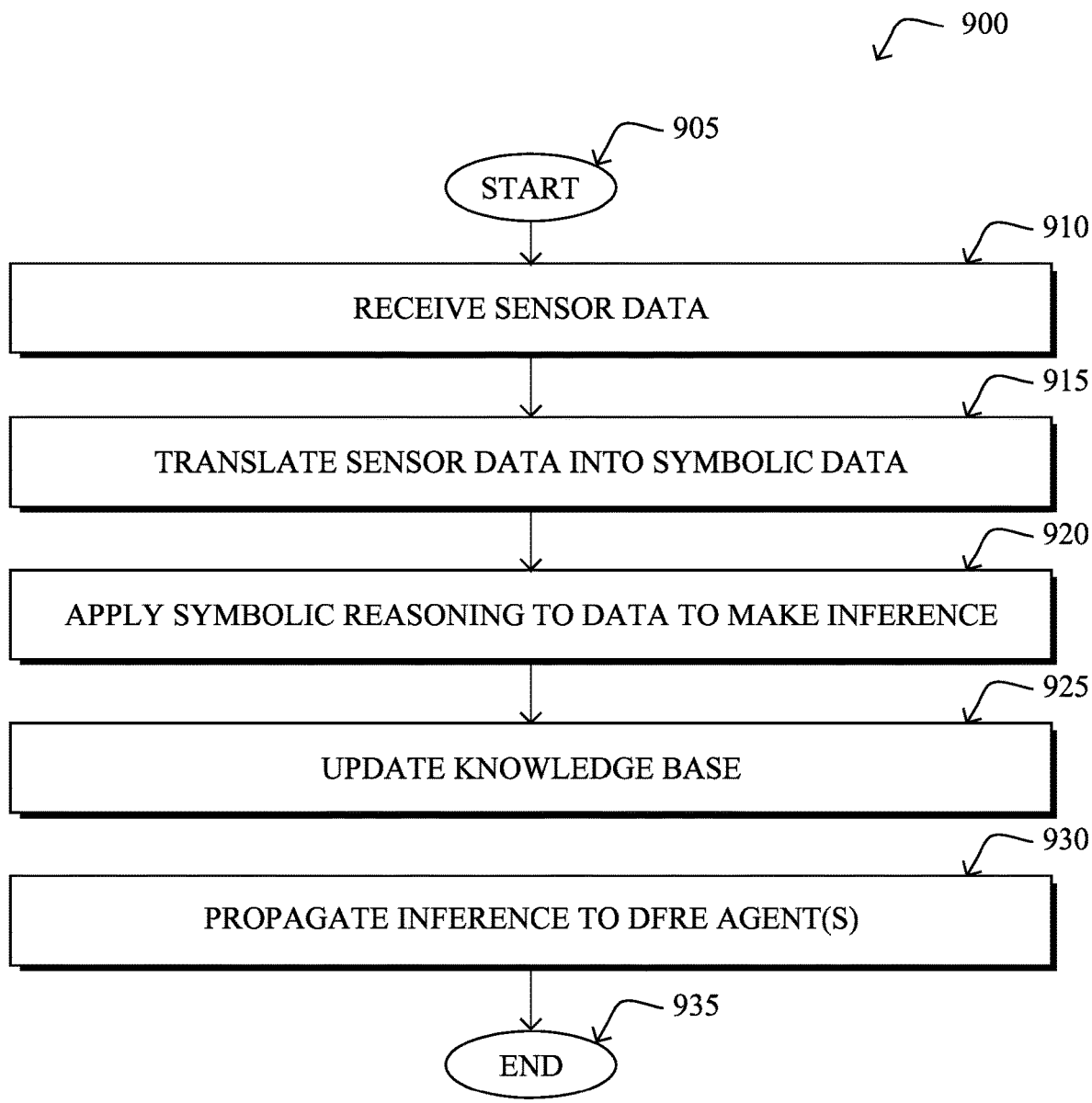
FIG. 9 illustrates an example simplified procedure for implementing federated artificial intelligence with cumulative learning in a computer network.

FIG. 9 illustrates an example simplified procedure 900 for implementing federated artificial intelligence with cumulative learning in a computer network, according to various embodiments. In general, a DFRE agent, which may be provided by one or more devices (e.g., a device 200), may perform procedure 900. As shown, procedure 900 may start at step 905 and continue on to step 910 where, as described in greater detail above, the DFRE agent may receive sensor data from one or more sensors in the network. For example, the one or more sensors may include a camera and the first sensor data may include a video stream from that camera. In further embodiments, the sensor(s) may include network telemetry exporters, physical sensors in the network, or any other device that provides measured data for analysis to the DFRE agent.

At step 915, as detailed above, the DFRE agent may translate the sensor data into symbolic data. In some embodiments, the DFRE agent may analyze the sensor data to recognize patterns in the sensor data and map those recognized patterns to concepts using a conceptual space. For example, the DFRE agent may identify a vehicle within a video stream and map the identified vehicle to one or more concepts such as "vehicle crash," "moving object," etc.

At step 920, the DFRE agent may apply using a symbolic knowledge base maintained by the first DFRE agent, symbolic reasoning to the symbolic data to make an inference regarding the first sensor data, as described in greater detail above. In various embodiments, the knowledge base may be instantiated using a seed ontology and the DFRE agent may apply an AIKR-based reasoner to the knowledge base, to make the inference. For example, in the case of a detected vehicle crash in a video stream, the reasoner may infer that the vehicle is a hit-and-run driver.

At step 925, as detailed above, the DFRE agent may update the knowledge base, based on the inference regarding the first sensor data. For example, if the DFRE agent infers that a particular vehicle is involved in a hit-and-run, it may update the knowledge base to categorize that vehicle as a hit-and-run vehicle that should be tracked. Thus, when the DFRE agent analyzes additional video stream data from the camera, it may purposely attempt to track the vehicle over time.

At step 930, the DFRE agent may propagate the inference to one or more other DFRE agents in the network, as described in greater detail above. In one embodiment, the DFRE agent may do so by publishing the inference to an in-memory database server in the network, such as a Redis server. In turn, the one or more other DFRE agents may subscribe to the server, so that they also receive the published inference and update their knowledge bases, accordingly. In some embodiments, the DFRE agent may first apply a filtering mechanism to the inference (e.g., the agent may not publish all of its inferences). In one embodiment, the DFRE agent may compute a length of the chain of reasoning associated with the inference and, based on the computed length, determine that the inference should be propagated to the one or more other DFRE agents. In another embodiment, the DFRE agent may identify a class of event associated with the inference and, based on the class, determine that the inference should be propagated. For example, in the case of a hit-and-run event, the DFRE agent may determine that other DFRE agents evaluating video streams from other cameras should be notified of the inference, so that they can continue to track the offending vehicle as it flees the scene of the accident. Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, systems and methods are introduced herein for federated artificial intelligence in a network using cumulative learning. More specifically, various learning agents located throughout the network can share acquired knowledge in a manner that does not require the maintenance of a single, centralized knowledge base, which can be overly cumbersome for many deployments.

While there have been shown and described illustrative embodiments that provide for federated artificial intelligence with cumulative learning in a computer network, it is to be understood that various other adaptations and modifications may be made within the spirit and scope of the embodiments herein. For example, while certain embodiments are described herein with respect to using a DFRE to assess video streams, these embodiments are exemplary only and one skilled in the art would easily recognize that the teachings herein can be adapted to evaluate a plethora of other subservice options, as well. For example, such a framework can also be applied to the network for purposes of network assurance (e.g., by analyzing network telemetry data indicative of the state of the network, etc.), detecting and addressing security issues, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a first deep fusion reasoning engine (DFRE) agent in a network, first sensor data from a first set of one or more sensors in the network;
translating, by the first DFRE agent, the first sensor data into symbolic data;
applying, by the first DFRE agent and using a symbolic knowledge base maintained by the first DFRE agent, symbolic reasoning to the symbolic data to make an inference regarding the first sensor data;
updating, by the first DFRE agent and based on the inference regarding the first sensor data, the symbolic knowledge base;
computing, by the first DFRE agent, a length of a chain of reasoning associated with the inference;
determining, by the first DFRE agent and based on the computed length of the chain of reasoning associated with the inference that the inference should be propagated to one or more other DFRE agents; and
propagating, by the first DFRE agent, the inference to the one or more other DFRE agents in the network.

2. The method as in claim 1, further comprising:
initiating the symbolic knowledge base with a seed ontology.

3. The method as in claim 1, wherein propagating the inference to the one or more other DFRE agents in the network comprises:
publishing, by the first DFRE agent, the inference to an in-memory database server in the network, wherein the one or more other DFRE agents subscribe to the server.

4. The method as in claim 1, wherein the one or more other DFRE agents receive second sensor data from a second set of one or more sensors, and wherein the one or more other DFRE agents analyze the second sensor data using the inference propagated by the first DFRE agent.

5. The method as in claim 1, further comprising:
identifying, by the first DFRE agent, a class of event associated with the inference; and
determining, by the first DFRE agent, that the inference should be propagated to the one or more other DFRE agents, based on the class of event associated with the inference.

6. The method as in claim 1, wherein the one or more sensors comprise a camera, and wherein the first sensor data comprises a video stream.

7. The method as in claim 1, further comprising:
receiving, at the first DFRE agent, an inference made by one of the one or more other DFRE agents in the network; and
updating, by the first DFRE agent and based on the received inference, the symbolic knowledge base maintained by the first DFRE agent.

8. The method as in claim 1, further comprising:
receiving, at the first DFRE agent, an indication of a focus of attention for the first sensor data, wherein the first DFRE agent applies symbolic reasoning to the symbolic data based in part on the focus of attention.

9. An apparatus, comprising:
one or more network interfaces to communicate with a network;
a processor coupled to the one or more network interfaces and configured to execute one or more processes; and
a memory configured to store a process executable by the processor, the process when executed configured to:
receive first sensor data from a first set of one or more sensors in the network;
translate, by a first DFRE agent executed by the apparatus, the first sensor data into symbolic data;
apply, by the first DFRE agent and using a symbolic knowledge base maintained by the first DFRE agent, symbolic reasoning to the symbolic data to make an inference regarding the first sensor data;
update, by the first DFRE agent and based on the inference regarding the first sensor data, the symbolic knowledge base;
compute, by the first DFRE agent, a length of a chain of reasoning associated with the inference;
determine, by the first DFRE agent and based on the computed length of the chain of reasoning associated with the inference that the inference should be propagated to one or more other DFRE agents;
propagate the inference to the one or more other DFRE agents in the network.

10. The apparatus as in claim 9, wherein the process when executed is further configured to:
initiate the symbolic knowledge base with a seed ontology.

11. The apparatus as in claim 9, wherein the apparatus propagates the inference to the one or more other DFRE agents in the network by:
publishing the inference to an in-memory database server in the network, wherein the one or more other DFRE agents subscribe to the server.

12. The apparatus as in claim 9, wherein the one or more other DFRE agents receive second sensor data from a second set of one or more sensors, and wherein the one or more other DFRE agents analyze the second sensor data using the inference propagated by the first DFRE agent.

13. The apparatus as in claim 9, wherein the process when executed is further configured to:
identify a class of event associated with the inference; and
determine that the inference should be propagated to the one or more other DFRE agents, based on the class of event associated with the inference.

14. The apparatus as in claim 9, wherein the one or more sensors comprise a camera, and wherein the first sensor data comprises a video stream.

15. The apparatus as in claim 9, wherein the process when executed is further configured to:
receive an inference made by one of the one or more other DFRE agents in the network; and update, based on the received inference, the symbolic knowledge base maintained by the first DFRE agent.

16. The apparatus as in claim 9, wherein the process when executed is further configured to:
receive an indication of a focus of attention for the first sensor data, wherein the first DFRE agent applies symbolic reasoning to the symbolic data based in part on the focus of attention.

17. A tangible, non-transitory, computer-readable medium storing program instructions that cause a first deep fusion reasoning engine (DFRE) agent in a network to execute a process comprising:
receiving, at the first DFRE agent, first sensor data from a first set of one or more sensors in the network;
translating, by the first DFRE agent, the first sensor data into symbolic data;
applying, by the first DFRE agent and using a symbolic knowledge base maintained by the first DFRE agent, symbolic reasoning to the symbolic data to make an inference regarding the first sensor data;
updating, by the first DFRE agent and based on the inference regarding the first sensor data, the symbolic knowledge base;
computing, by the first DFRE agent, a length of a chain of reasoning associated with the inference;
determining, by the first DFRE agent and based on the computed length of the chain of reasoning associated with the inference that the inference should be propagated to one or more other DFRE agents;
propagating, by the first DFRE agent, the inference to the one or more other DFRE agents in the network.

18. The computer-readable medium as in claim 17, wherein propagating the inference to the one or more other DFRE agents in the network comprises:
publishing, by the first DFRE agent, the inference to an in-memory database server in the network, wherein the one or more other DFRE agents subscribe to the server.

\* \* \* \* \*

UNITED STATES PATENT AND TRADEMARK OFFICE
CERTIFICATE OF CORRECTION

| | | |
|---|---|---|
| PATENT NO. | : 11,966,413 B2 | |
| APPLICATION NO. | : 16/811806 | |
| DATED | : April 23, 2024 | |
| INVENTOR(S) | : Hugo Latapie et al. | |

It is certified that error appears in the above-identified patent and that said Letters Patent is hereby corrected as shown below:

In the Specification

Column 12, Line 53 please amend as shown:
suitable in many deployments, the use of a centralized Signed and Sealed this
Sixteenth Day of July, 2024

Katherine Kelly Vidal
*Director of the United States Patent and Trademark Office*